May 9, 1961   E. ESTREMS ET AL   2,983,357
ELECTRONIC COUNTER CONTROL FOR CONTINUOUS FORMS FEEDING
Filed Oct. 22, 1959   5 Sheets-Sheet 1

INVENTORS
EUGENI ESTREMS
MAURICE PAPO

BY *Maurice H. Klitzman*
ATTORNEY

United States Patent Office 2,983,357
Patented May 9, 1961

2,983,357

ELECTRONIC COUNTER CONTROL FOR CONTINUOUS FORMS FEEDING

Eugeni Estrems, Saint-Mande, and Maurice Papo, Paris, France, assignors to International Business Machines Corporation, New York, N.Y., a corporation of New York Filed Oct. 22, 1959, Ser. No. 847,939

Claims priority, application France Dec. 31, 1958

11 Claims. (Cl. 197—133)

This invention relates to devices for feeding continuous business forms, and more particularly, to an electronic counter control for feeding continuous forms.

In punched card accounting machines, the continuous forms must be advanced after the printing of each line. The continuous forms may be advanced by small increments, commonly referred to as line spacing, or by generally larger increments, commonly referred to as skipping. In the prior art, line spacing is the predetermined distance between lines of adjacent printed items, and skipping is the distance from one section to another section on a continuous form where the next printing is to take place. The paper skips may often involve large movement of the continuous forms to advance to the next printing line. In order to increase the speed of the machine, it is the practice to skip at a high speed to the next line to be printed. Therefore, it is desirable to reduce the speed of the continuous forms before reaching the stop position to avoid detrimental effects due to high inertia forces.

In present-day machines it is customary to employ a carriage control tape synchronized with the movement of the continuous forms to control the skipping and stopping operations according to prepunched holes in the tape. The paper tape system does not easily lend itself to the controlling of the deceleration toward the end of a long skip period. The paper tape system also has other shortcomings in that the tape itself, the perforations, and the read brushes for reading the perforations are subject to wear and mutilation requiring frequent replacement. Further, the operator must have a punch to perforate the tape to make different tapes to match different size forms.

It is the main object of this invention to provide electronic counter control means directly controllable by a machine instruction program of an accounting machine instead of by a separate control means such as paper tape or by manual setting of levers which are directly associated with the carriage.

It is another object of this invention to provide electronic counters for controlling carriage operations to control both line spacing and skipping of the carriage.

It is still another object of this invention to provide a simple electronic counter system which utilizes the zero position on the counter as the position at which the carriage is stopped instead of using various comparing circuits to accomplish the same purpose.

It is still another further object of this invention to simplify the programming for an operator by the use of pluggable carriage control programs and electronic counters.

Briefly stated and in accordance with one aspect of this invention, an electronic counter control arrangement for controlling the movement of a carriage is provided in which the accounting machine's program provides both a start signal to initiate paper advance and simultaneously actuates carriage program conditioned logical circuitry to test whether a skipping or line spacing operation shall take place. In accordance with another aspect of the invention, the abovementioned carriage program circuits are pluggable and can be wired by the operator to indicate the line number or lines to be skipped by the paper when a specific condition of the carriage in the accounting machine is called for. In accordance with still another aspect of this invention, two counters are provided which cooperate with the pluggable carriage program to advance the carriage and the paper to the next print line position. This is accomplish by a position counter, indicating the position of the next line to be printed, and a skip counter which indicates the number of line spaces between the present line and the line to be skipped to. The carriage then provides pulses to the skip counter to reduce the count, the skip counter slowing the carriage down when the count approaches zero, and the skip counter providing a pulse to stop the carriage when the count reaches zero.

Other objects and advantages of the invention will be pointed out in the following description, and illustrated in the accompanying drawings which disclose by way of example the principle of the invention, and the best mode which has been contemplated of applying that principle.

In the drawings:

Fig. 1 is a schematic block representation of the continuous forms skip and line spacing control device in accordance with the present invention.

Figs. 2a, 2b, and 2c show the electronic circuitry for a continuous forms skip control device in accordance with the invention.

Fig. 2d schematically shows the position of the electronic circuitry of Figs. 2a, 2b, and 2c.

Fig. 3 is a detailed representation of the counter triggers shown in block diagram form, labeled B in Fig. 2a.

Figure 1:
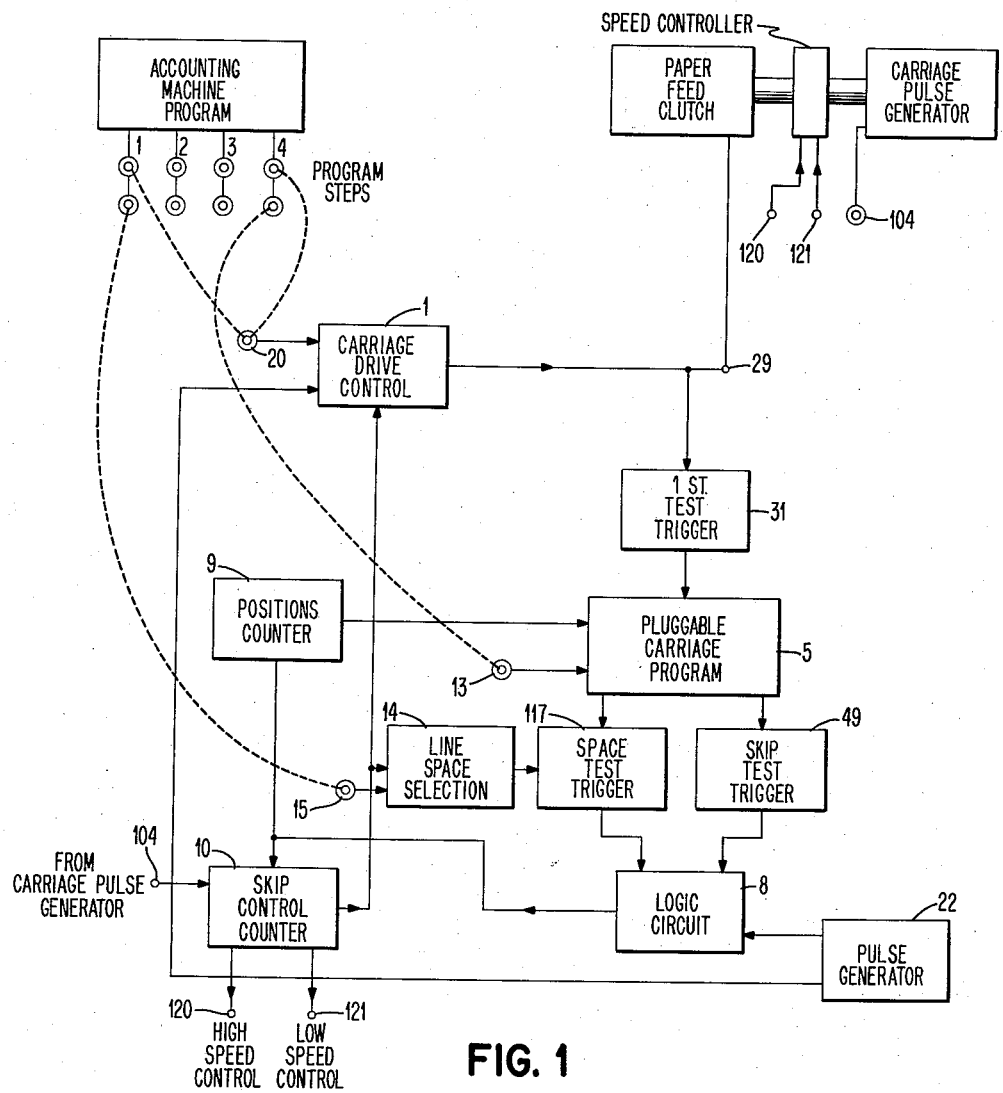

The following is a general description of the configuration of the control device shown schematically in Fig. 1. In order to start the carriage control operation, a pulse is received from the accounting machine which indicates one of a plurality of program steps. This pulse is received by hub 20 to activate a carriage drive control 1. Under the action of timing pulses provided by a pulse generator 22, carriage drive control circuit 1 causes energization of the paper feed clutch connected to terminal 29. In order to determine whether a skip or space operation is to take place, the same pulse activates a test trigger 31 to initiate tests through the carriage program 5, containing the pluggable carriage program logic circuits to ascertain whether a machine program step is plugged to either of hubs 13 or 15 which determines whether the space test trigger 117 or skip test trigger 49 shall be activated at this time. Under control of the space or skip test triggers, logic circuits 8 become activated to govern the gating of pulses from pulse generator 22 to position counter 9 and skip control counter 10. These counters will continue to advance until the position counter 9 arrives at the count predetermined by the operator to be the next stop position of the continuous forms for this particular skip condition as indicated by plugging of the carriage program circuits 5 and the wiring of the accounting machine program step to plug hub 13. The advance of position counter 9 to this next stop line position, through the carriage program circuits 5, turns skip test trigger 49 to state "0." This conditions logic circuit 8 to gate out further advance pulses from the pulse generator 22 and stops the counters. Position counter 9 then indicates the line of the next stop position, whereas skip counter 10 indicates the number of steps to be skipped over to arrive at that stop position.

During the counting operation, the clutch mechanism for driving the paper is operated. However, the paper does not move until after the counters have stopped, since there is some lag in the driving mechanisms for the carriage. During the paper movement, the carriage emits pulses which are applied to skip counter 10, there being one pulse for each line spaced to make the counter regress to zero. When the number appearing in skip counter 10 approaches zero, the speed of the paper is slackened through use of the skip control counter 10 selectively switching from the terminal 120 to terminal 121. When the skip counter reaches zero, the paper stops as a result of the action of skip counter 10 on the carriage drive control 1.

In case of a line spacing operation, counters 9 and 10, which control the paper movement, are similarly started by space test trigger 117. However, the counters are now stopped under control of the line space selection pluggable logic circuits 14 appearing on terminal 15 and from the skip counter 10 rather than from the position counter 9 and pluggable program 5 as for a skip operation, explained above. The proper selection of these hubs has been preplugged by the operator to signify the proper extent of line spacing to be performed at this program step.

Figure 2D:
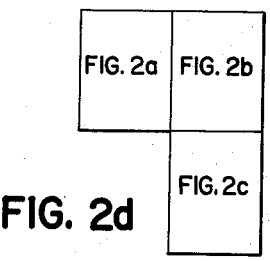
Figure 2A:
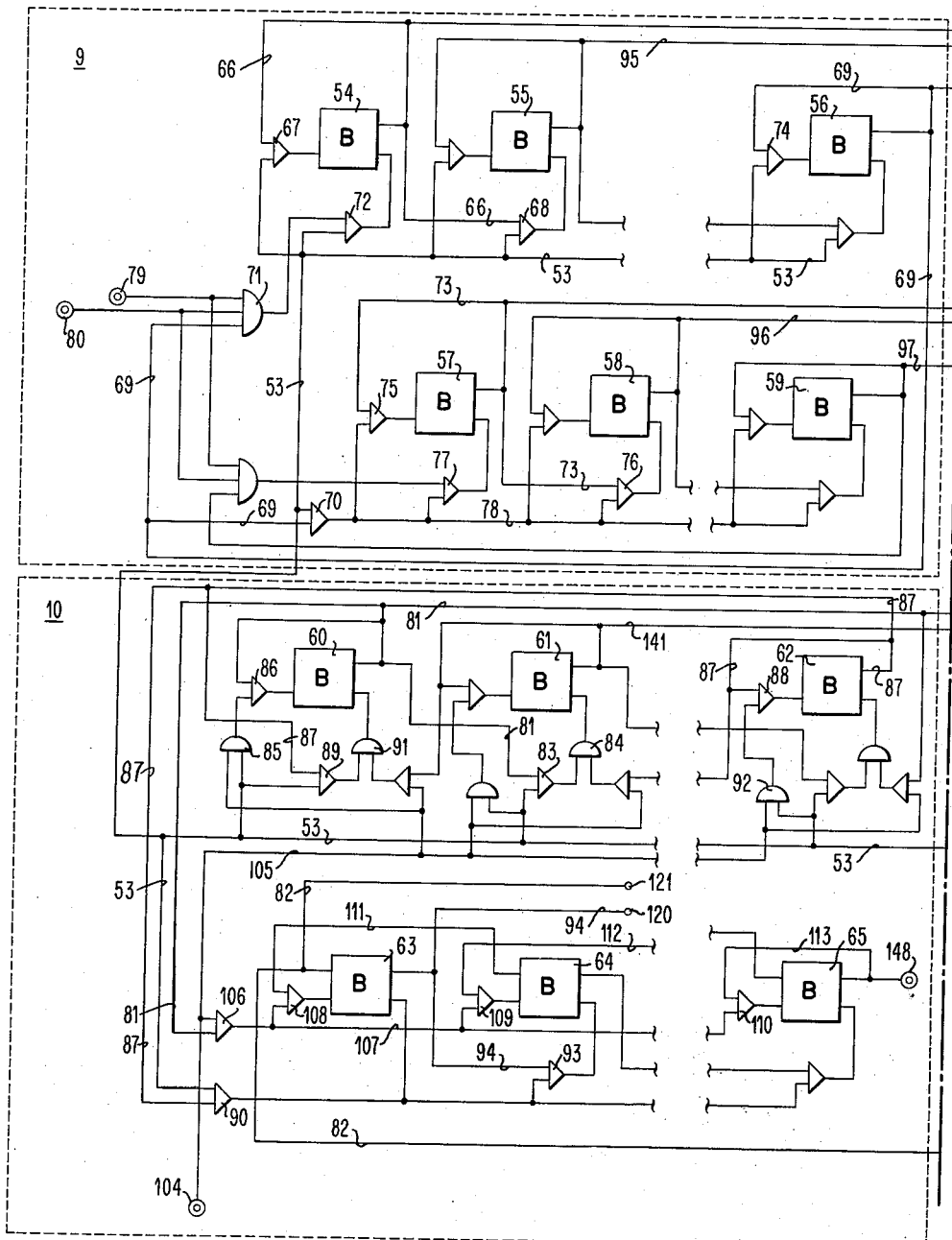

The detailed operation of the circuits will now be described with reference to Figs. 2a, 2b, and 2c. Particularly, reference is made to Fig. 2b in which the carriage program switching circuits 5, described in connection with Fig. 1, are disclosed in more detail. Hubs 38 through 42 represent lines on the continuous forms. Although only five hubs are shown, as many hubs as there are lines would normally be provided. For example, a representative form 22 inches long would consist of 132 lines if the customary spacing of ⅙ inch between lines is used. Therefore, 132 hubs would be used. When the accounting machine arrives at a particular step in its program, hubs become activated to provide a power source to initiate a carriage operation. A pulse is then received from a predetermined program step operation hub by carriage start terminal 20 (Fig. 2c). This brings up one side of AND circuit 21, and when the other side of AND circuit 21 is activated by the pulse generator 22, a carriage start trigger 24 will be turned to state "1." The carriage start trigger going to state "1" will cause AND circuit 28 through line 25 to be activated provided that all the carriage interlocks are met. That is, if hub 26 is activated, by reason of the fact that the carriage is not moving, the paper is in the carriage, etc., AND circuit 28 coming up turns carriage control trigger 27 to state "1." (Carriage start trigger 24 and carriage control trigger 27 were referred to previously as carriage drive control 1 in Fig. 1.) The turning on of trigger 27 provides an impulse to hub 29 to energize the carriage feed clutch. However, since the carriage drive mechanism is a slow starting device, there will be a relatively lengthy time interval before the carriage actually starts moving.

Simultaneously, one side of AND circuit 30 is activated, and as the other side of this AND circuit is activated by the pulse generator 22 over line 23, first test trigger 31 is turned to state "1" bringing up line 32. Line 32 (Fig. 2b) now feeds a signal to all of the OR circuits 33 to 37, inclusive. OR circuits 33 to 37 are connected to hubs 38 through 42 which represent lines on the continuous form. Hubs 38 through 42 are selectively connected according to a program plugged by the operator to either of hubs 43a, 44a, or 45a. One of the hubs 43a, 44a, or 45a conditions one portion of a predetermined AND circuit 43, 44, or 45, respectively. The other side of a predetermined AND circuit 43 through 45 is connected to one of the hubs 43b, 44b, and 45b. One of these hubs 43b through 45b is selectively connected to the accounting machine program steps in accordance with the desired program to be accomplished. (It is noted that these hubs 43b through 45b were represented as hub 13 in Fig. 1.) One of the AND circuits 43 through 45 conditions OR circuit 47 so as to activate control line 46.

Referring to Fig. 2c, control line 46 is connected to skip test trigger 49 through AND circuit 48, so as to turn to state "1" if a skip wire is plugged from one of the hubs 38 through 42 to one of the hubs 43a through 45a. The skip test trigger 49 is connected to line 50 which in turn is connected to OR circuit 52. Now OR circuit 52 conditions one side of AND circuit 51 with the output of the pulse generator 22 conditioning the other side. The pulses of the pulse generator then advance counters 9 and 10 over line 53 as shown in Fig. 2a. This causes both counters to advance.

The pulses from the pulse generator 22 are transmitted over line 53 through AND circuit 51 to the position counter 9 so as to operate unit triggers 54 through 56 (Fig. 2a), and tens triggers 57 through 59. Assuming that trigger 54 is at its state "1" condition, line 66 is up, thus conditioning AND circuits 67 and 68 so that the first advance pulse from line 53 switches trigger 55 to its state "1" condition through AND circuit 68 and switches trigger 54 to "0" through AND circuit 67. Therefore, trigger 54 represents a count of zero when in its state "1" condition, and trigger 55 represents a count of one when in its state "1" condition. Similarly, the next pulse will switch the next trigger to its state "1" condition, and trigger 55 will be turned to its state "0" condition and so on until the last trigger 56 is then in its state "1" condition. At that instant, line 69 will be up, and if it is assumed that trigger 57 is in its state "1" condition, that is, that line 73 is up, AND circuits 70, 74, 75, 76, and 77 will be conditioned as well as AND circuit 72 through OR circuit 71. The next pulse from pulse generator 22, over line 53, through AND circuit 74, will switch trigger 56 back to "0" state. The same pulse will switch trigger 54 to its state "1" condition through AND circuit 72. Also, the same pulse will switch trigger 58 to its state "1" condition through AND circuits 70 and 76, and also, the same pulse will switch trigger 57 to its state "0" condition through AND circuits 70 and 75. It is therefore seen that the tens chain receives advance pulses through AND circuit 70 and line 78 when the last trigger 56 of the units chain is in its state "1" condition. The units chain, therefore, begins advancing again from its starting point. When the number of counts equals the number of line spaces on a form, the counter 9 is returned to its starting position by triggers 54 through 59 being reset to zero by means (not shown), and the first trigger 54 is set to its state "1" condition by hubs 79 and 80 which are connected to the instruction programs.

In order to stop the carriage after a skip or space operation, a second counter, referred to as a skip counter 10, is provided and operates differently from the position counter 9 in that it is reversible. Referring to Fig. 2a, and particularly the skip counter 10, triggers 60 to 62 comprise the unit chain, whereas the triggers 63 to 65 comprise the tens chain. Before the counters receive any pulses from the pulse generator 22, trigger 60 is in a state "1" condition rather than "0" state, whereas trigger 63 is in its state "0" condition. Triggers 60 to 62 are connected to line 81 and triggers 63 to 65 are connected to line 82. Line 81 is up when trigger 60 is in its state "1" condition, whereas line 82 is up when trigger 63 is in its state "0" condition. The first advance pulse applied to line 53 from pulse generator 22 conditions AND circuit 83 and OR circuit 84 so as to switch trigger 61 to its state "1" condition. Also, OR circuit 85 and AND circuit 86 are conditioned so as to switch trigger 60 to its state "0" condition. Therefore, trigger 60 goes to its state "0" condition with the first pulse from pulse generator 22, bringing line 81 down. The operation continues with successive pulses until trigger 62 is in its state "1" condition, thus bringing line 87 up which conditions AND circuits 88, 89, and 90 so that the next pulse switches trigger 60 to its state "1" condition through AND circuit 89 and OR circuit 91. This pulse also switches trigger 63 through AND circuit 90 and trigger 62 to its state "0" condition through OR circuit 92 and AND circuit 88. The unit chain will continue to advance with each pulse until trigger 62 is in its state "1" condition. The next advance pulse through AND circuits 90 and 93 switches trigger 64 to its state "1" condition, since AND circuit 93 is conditioned by line 94 being up because of the state "1" condition of trigger 63, which is not reset when trigger 64 turns to its state "1" condition. Thus, on each return of the unit chain to its starting point, the successive triggers of the tens chain are switched to their state "1" condition without the preceding triggers returning to their state "0" condition.

It is to be noted that the terms "unit chain" and "tens chain" are to be understood in their most liberal sense since each chain may possibly comprise any number of triggers determined by the number of positions to be counted. For example, the units chain may contain five (5) triggers, and the tens chain may contain seven (7) triggers. It may be more suitable for most situations to use ten (10) triggers for each of the units and tens chains.

As a result of the pulses received from pulse generator 22 along line 53, both the position counter 9 and the skip counter 10 start to advance. The position counter will advance from the place where it has stopped during a preceding operation to show the present position of the forms and the skip counter 10 from its zero position.

Figure 2B:
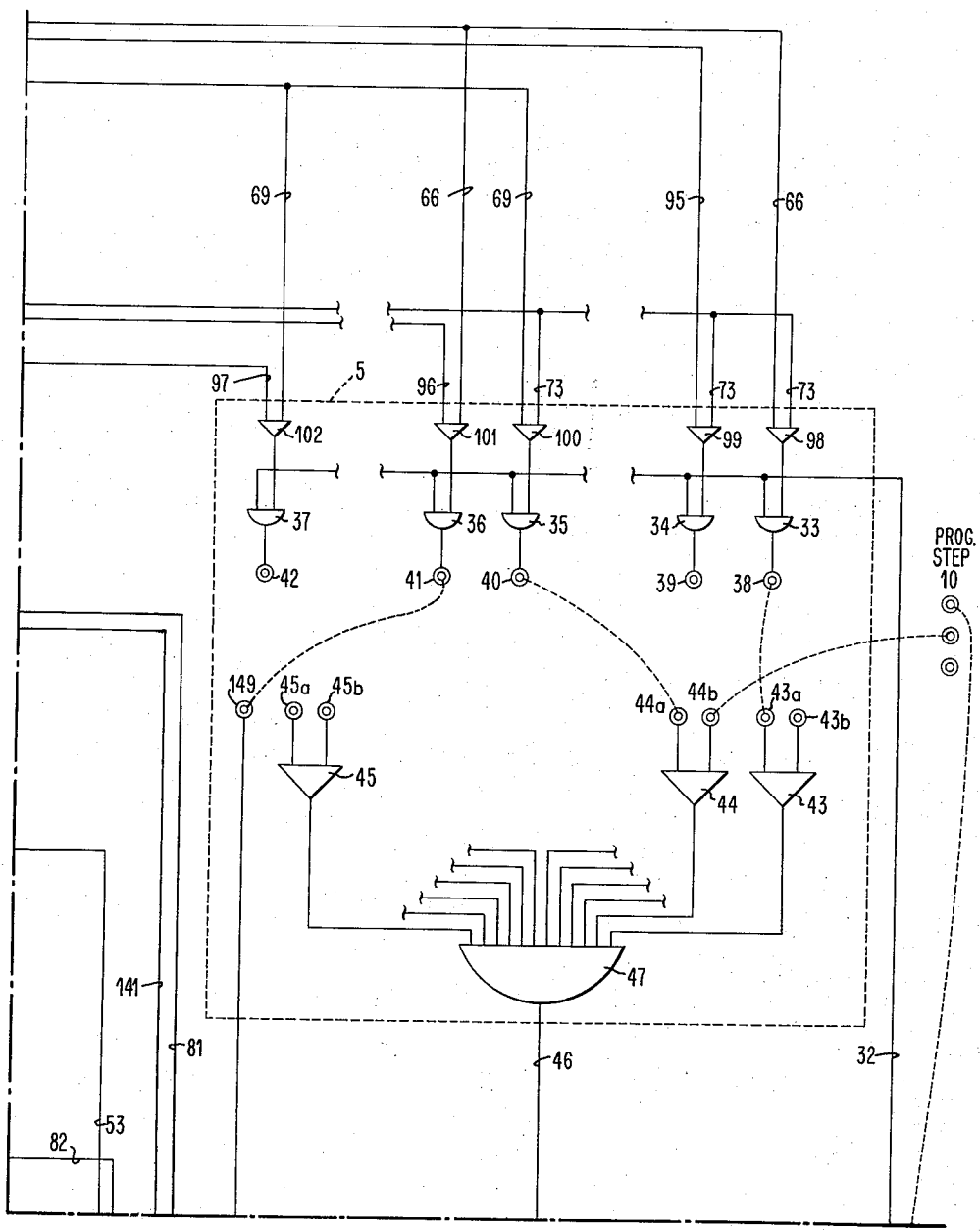
Figure 2C:
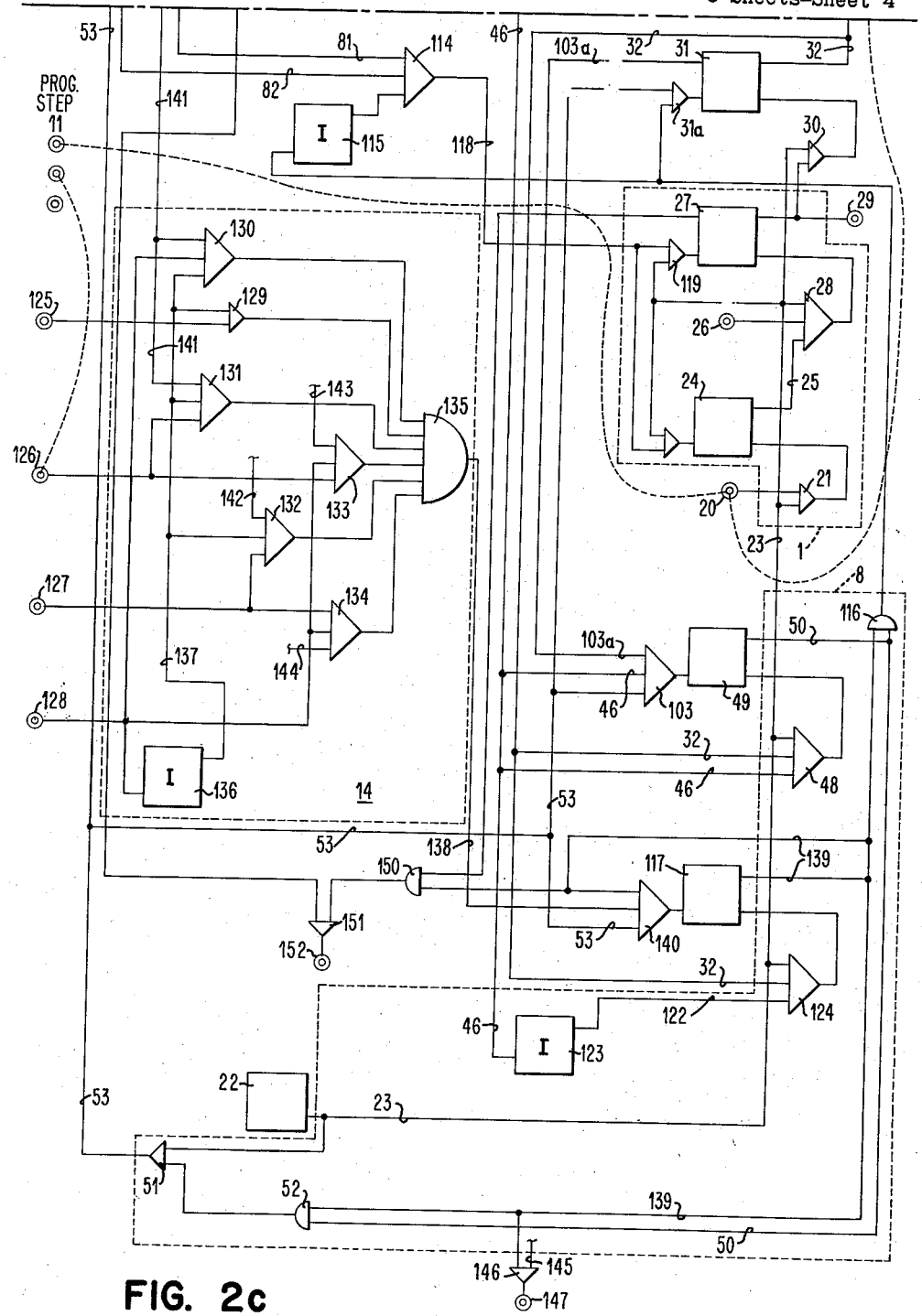
Figure 3:
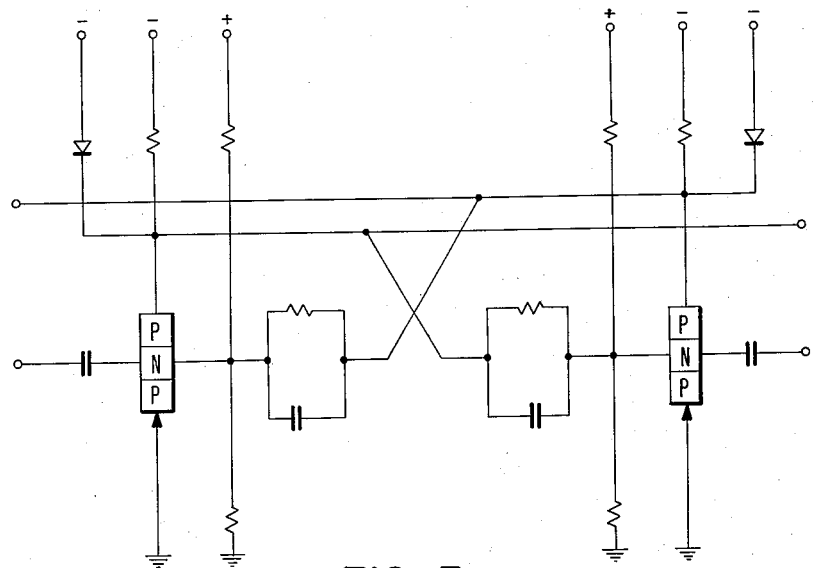
Figure 4:
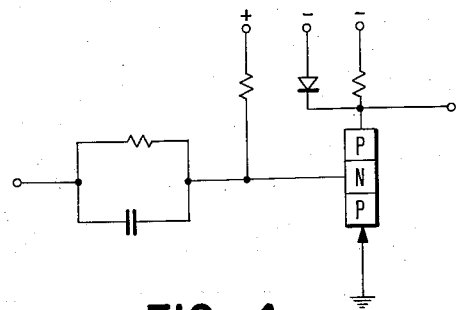
Fig. 4 is a detailed diagram of an inverter circuit shown in block diagram form, labeled I in Fig. 2c which can be used in a continuous forms skip control device in accordance with the invention.

In order to stop the counters at the next setting which would be indicative of the position of the printing of the next line, the output lines 66, 69, 73, 95, 96, and 97 from triggers 54 through 59 are connected to the carriage program means 5 (Fig. 2b). The carriage program circuits 5 include AND circuits 98 through 102. Hubs 38 to 42 are activated when triggers 54 through 59 are in state "1" condition. When the position counter 9 arrives at the position preceding that of the stop line indicated by the carriage program skip condition, the hub which is connected to hub 44a will be activated along with hub 44b, so that through AND circuit 44, OR circuit 47, and line 46, one of the inputs of AND circuit 103 will be conditioned (Fig. 2c). Since the first test trigger 31 will have been reset during the switching to state "1" of trigger 49, line 103a will also be up so that the next pulse from the pulse generator 22 will reset skip test trigger 49 and further advance the counters one more step. Also, the resetting of trigger 49 stops the pulses from pulse generator 22 by gating AND circuit 51 off. When the advance pulses are stopped, the position counter will be stopped on the skip stop line position to which the paper is to be moved, whereas the skip counter indicates the number of lines to be jumped over during the skipping operation of the continuous forms.

At this time, the pulse received from the terminal 29 at the beginning of the operation will have energized the paper feed clutch, which through the mechanical gearing will start the paper to move or unwind. Now, in order to inform the counters when a line on the paper has passed the printing station during the time the paper is unwinding, a carriage pulse generator, which could be a commutator or the like, can be provided on the carriage shaft so that a pulse is sent to terminal 104 (Fig. 2a) so as to make the skip counter regress from the number indicated on the counter. These pulses may be referred to as regress pulses and operate the unit chain of the skip counter in a way very similar to that of the advance pulses received from the pulse generator 22. However, the connections in the triggers are made from right to left instead of being from left to right as viewed in Fig. 2a for the advance pulses. Whenever unit trigger 60 is in its state "1" condition, AND circuit 106 is conditioned by line 81 being up, and a regress pulse is thus applied to line 107, so as to bring to state "0" those triggers of triggers 63 to 65 which are in state "1" condition and are to the left of the trigger which is in state "0" condition, since the corresponding one among AND circuits 108 to 110 is then conditioned by the corresponding line 111 to 113 being up.

When the skip counter has returned to its starting "0" position, trigger 60 will be in a state "1" condition and trigger 63 in a state "0" condition, with leads 81 and 82 being up. Now, AND circuit 114 (Fig. 2c) has a third input, which is also up as a result of inverter 115 connected through OR circuit 116 to the negative output of triggers 49 and 117, so as to bring line 118 up so that AND circuit 119 gates the next timing pulse and causes trigger 27 to be turned to state "0" condition. When this occurs, terminal 29 will be switched down so as to de-energize the paper clutch mechanism.

The arrangement of the counters permits the paper to unwind at high speed if the skip that is to be performed is large and to slacken the speed of the paper shortly before it stops. For example, this can be accomplished by using trigger 63 (Fig. 2a). When trigger 63 is in its state "1" condition, if the number of line spaces to be jumped over during the skipping operation is equal to or greater than the number of the counter, the high speed magnet of the speed controller will be energized. On the other hand, if the number of line spaces to be jumped over during the skipping is less than the number of the counter, the carriage will be shifted to low speed, since trigger 63 is then in a state "0" condition. Since trigger 63 represents the number 10 in this arrangement, a skip 10 or greater will move the carriage at high speed, whereas a skip less than 10 will move the carriage at low speed. Also, if the carriage is moving at high speed, the carriage will be changed to low speed when the regress pulses shift the count to less than 10. Line 94 is connected to terminal 120 when it is up and controls the high unwinding speed of the carriage when trigger 63 is in its state "1" condition, whereas line 82 when up, connected to terminal 121, controls the paper unwinding at low speed when trigger 63 is in its "0" state. Although trigger 63 has been chosen for the determining point, whether a skip or space condition should be at high or low speed, a trigger of lower or higher value could have been chosen.

The following describes how the pulse generator 22 is gated to advance the counters when the machine program calls for a spacing operation instead of a skip. If the machine instruction program step does not indicate a skip condition during the first test, none of the AND circuits 43 to 45 (Fig. 2b) will be conditioned and line 46 will not be up. The timing pulse will not be able to switch skip test trigger 49 to its state "1" condition, but since lines 32 and 122 are up as a result of inverter 123, space test trigger 117 will be switched to its state "1" condition through that timing pulse which is transmitted through AND circuit 124. The switching to state "1" of the trigger 117 will reset first test trigger 31 to zero through line 139 and OR circuit 116 and AND circuit 31a. Also, the switching to state "1" of trigger 117 brings up line 139, and through OR circuit 52, AND circuit 51 will be activated to permit advance pulses to be sent from the pulse generator 22 to the counters 9 and 10 through line 53 as described previously in connection with the skipping operation. Both counters will start to advance as in the case of skipping.

When a succeeding machine instruction program step appears, for example, program step 11, one of the program hubs will be connected to the carriage start hub 20 and one of the other hubs of the program step will be connected to one of the terminals 125, 126, or 127 (indicated as hub 15 in Fig. 1), according to whether the spacing that is to be performed has been determined to be single, double, or triple, as determined by where the next printing on the continuous forms is to take place. Also, another terminal 128 is provided which can be connected to the machine program hub if the above spaces are to be doubled. This then enables line spacing to be one to six spaces. If the spacing is to be single, one of the hubs of program step 11 will be connected to terminal 125. Line 137, which is the output line of inverter 136, will be up, and AND circuit 129 and OR circuit 135 along with the line 138 will also be up, along with line 139 connected to the output condition "1" of space test trigger 117. The first advance pulse applied to line 53 from pulse generator 22 will return the space test trigger 117 back to its state "0" condition through AND circuit 140. This will stop the advance pulses and the counters will have advanced one step.

If the program step requires that a double spacing or doubled single spacing is to be performed, line 138 is brought up either through AND circuit 131 or through AND circuit 130, when line 141 is up, i.e., when the skip counter has advanced one position. The reset pulse of the space trigger 117 makes the counter advance another step.

If a program step hub is connected to the triple space or other categories of spacing, the line connections are similar in that line 142 is connected to AND circuit 132 coming from the third trigger of skip counter 10 (triple spacing not shown because of break in drawing of Fig. 2a). Similarly, lines 143 and 144 which come from the fourth and sixth triggers of the skip counter (not shown) are connected in a similar manner to provide reset pulses for space test trigger 117 when four or six line spaces are called for. If, in the case of spacing, since no more than a total of six line spaces can be accommodated by the machine as described, a seventh trigger is accidentally placed in state "1" condition, terminal 147 will be up through lead 145 and AND circuit 146, which would then start an error signal which can be wired to stop the carriage or indicate a malfunction.

It is to be noted, in the case of a skipping operation, if the last trigger, 63 in Fig. 2a, of the tens chain of the skip counter has switched to state "1" condition, an error signal would be applied to terminal 148. The counter is designed so that in such a case it would indicate the number of steps to be jumped over higher than the highest number possible which can be wired to stop the carriage or indicate a malfunction.

When the continuous forms have reached the line which has been predetermined to be the last print line on the form, whether the form is stopped or further spacing is to be performed, a signal is transmitted from the position counter 9 through one of the hubs 38 through 42 which has been selected by plugging to hub 149 of the pluggable carriage program circuits 5. For example, hub 41, which may represent a line 41 on the form, which has been predetermined to be the last print line on the form, is shown connected to hub 149. Therefore, the terminal 152 will be activated through OR circuit 150 and AND circuit 151 and results in an overflow program control.

The following is a more detailed description of how the invention may be applied. As pointed out previously, hubs 38 through 42 represent lines on the continuous forms. It is assumed that the last previous printing took place at line 30 and that the machine has progressed through several program steps and that the next program step is No. 10. It is now desirable to print on line 40 and it is assumed that hub 40 truly represents line 40. This will then be a skip condition. In that event, hub 40 will have been plugged into hub 44a, hub 44b plugged into one of the hubs of program step No. 10 and carriage start hub 20 is plugged into another hub of program step No. 10. At machine instruction program step No. 10, hub 44b will be impulsed and also hub 20. Impulsing hub 20 will bring up AND circuit 21 and turn on start trigger 24. The start trigger 24 going on will cause AND circuit 28 to be activated provided that all of the carriage interlocks are met such as hub 26 is on indicating the carriage is not moving, paper is in the carriage, etc. AND circuit 28 coming on turns on skip control trigger 27. Skip control trigger 27 going on gives an impulse to terminal 29 to energize the paper feed clutch. However, since the carriage is essentially a relatively slow starting device, it will take a relatively long period of time to start operating. This will enable the electronic circuits to make the necessary tests and counting operations to inform the carriage where to stop and whether to skip or space before it beings moving. Therefore, AND circuit 30 is activated and the first test trigger 31 comes on bringing up line 32. Line 32 feeds a signal to all of the OR circuits 33 through 37 and in particular activates OR circuit 35 and hub 40 which was previously indicated as being wired to AND circuit 44 through hub 44a. Therefore, AND circuit 44 will be activated because program step No. 10 contains a conditioned hub which is plugged into hub 44b. Since AND circuit 44 is conditioned, OR circuit 47 becomes hot so as to bring up control line 46.

Referring now to Fig. 2c, control line 46 will now turn on skip test trigger 49. Skip test trigger turns on because a skip wire plug was provided between hub 40 and 44a. (If hub 40 had not been plugged to 44a, a skip would not take place.) Now, skip test trigger 49 going on brings up line 50 and gates out through AND circuit 51 the output of pulse generator 22 which may be a very fast oscillator. The pulses from the pulse generator 22 then feed the skip counter 10 through line 53 causing it to advance and also feed the position counter 9 causing it to advance.

Since it was assumed that the carriage is sitting at line 30 and that it is desired to print on line 40, then the position counter contains the number 30 and the skip counter will, of course, be at zero. The pulses from the pulse generator 22 cause the position counter 9 and the skip counter 10 to advance and they will continue to advance until the position counter reaches 40. At that time, the skip counter will contain the difference between 30 and 40, or 10. When the position counter reaches 40, the output of the position counter 9 will activate AND circuit 100, Fig. 2b, providing a pulse through OR circuit 35 and a new pulse out of hub 40. This again activates AND circuit 44 providing a second pulse on line 46. It is noted that line 32 was turned off by turning off the first test trigger 31. The first test trigger 31 was turned off by the first pulse of the pulse generator 22 through the circuit from the pulse generator to AND circuit 51 over line 53 over to AND circuit 31a which is on the turn-off side of the first test trigger 31. The other side of AND circuits 31a comes from OR circuit 116. Therefore, there is only one initial pulse on line 46 and no more pulses appear on line 46 until the position counter goes to 40. Now the second pulse on line 46 which occurs when the counter reaches 40 will turn off the skip test trigger 49 because the first test trigger 31 is off, so that line 103a is up, line 46 is up, and line 53 is up, so that AND circuit 103 turns off the skip test trigger.

Now, the position counter 9 is sitting at line 40 and the skip counter is set with the number 10, since we are going to skip 10 spaces. Very shortly thereafter, sufficient time will have elapsed for the paper feed clutch to start the movement of the carriage and paper. The carriage will move at high speed, since the count of 10 would be in trigger 63 bringing up line 94 and terminal 120 which energizes the high speed side of the speed controller (Fig. 1). The carriage pulse generator is associated with the carriage so as to provide one pulse for each line space to the skip control counter. Therefore, the carriage pulse generator is connected to hub 104 of the skip control counter 10. The hub 104 will receive an impulse each time the carriage moves one line space. Each pulse will cause the skip counter to count down from the number 10. This is accomplished because of the manner of setting up the triggers. Since the space test trigger 117 is off, the output of the pulse generator 22 is gated off, and the hub 104 is therefore connected to a line which causes the skip counter to count down as previously discussed. When the skip counter arrives at zero, line 81 comes up. Line 81 will give an impulse to AND circuit 114. Now, line 82 is up because the tens counter is sitting at zero, and the output of inverter 115 is up because its input is not up. The input to inverter 115 is not up because the skip test trigger 49 is off. Line 118 will then turn off the carriage control trigger 27 when the skip counter arrives at zero. The carriage control trigger 27 goes off and deactivates hub 29 so as to stop the carriage. The stopping of the carriage positions the form at the next printing line 40.

If it is desired that line spacing should be the next operation, this will be determined by another program machine instruction step, for example, program step No. 11. One output of the program step is plugged to the carriage start hub 20. Another output of that program step is plugged to either single space, double space, or triple space, and in addition may be plugged to the double hub 128. For purposes of explanation of this invention, it is assumed that one of the output hubs of the program step No. 11 is plugged to the double spacing hub 126. Therefore, hub 126 will be energized and AND circuit 131 will be energized. Circuit 131 will be energized because inverter 136 will not be energized due to the fact that the hub 128 calling for double operation is not energized. Therefore, the output line 137 from the inverter 136 is up and the other line 141 of AND circuit 131 comes from the on side of the second trigger 61 of the skip counter.

Now, starting at hub 20, AND circuit 21 is turned on so as to turn on the carriage start trigger 24. This, in turn, turns on AND circuit 28 which turns on carriage control trigger 27 so as to activate hub 29 to start the carriage feed clutch. Trigger 27 also activates AND circuit 30 which turns on the first test trigger 31 which, in turn, activates line 32. However, no pulse is received on line 46 because the machine instruction program step 11 is not plugged to any of the AND circuits 43 through 45. Therefore, since line 46 is not up, inverter 123 will have an output and bring up AND circuit 124 which turns on the space test trigger 117. Space test trigger 117 going on will gate in the pulse generator 22 and line 53 will get a pulse and will advance the skip counter one position to trigger 61. When the skip counter advances to trigger 61, line 141 will be activated which will then activate AND circuit 131 so that OR circuit 135 produces an output to turn off the space test trigger 117. Therefore, when the skip counter registers a count of one (trigger 61), then the next pulse will turn off the space test trigger 117 with the skip counter going to two (the next trigger not shown). Now this space test trigger 117 being turned off, gates off the pulse generator 22 so that there are no further pulses on line 53. Now, the hub 104 to the skip counter 10 is activated by a carriage pulse generator on the carriage to indicate the advancement of each line space. This causes regress pulses so that the skip counter counts back to zero. When it arrives at zero (trigger 60 in the "1" state), line 81 is activated so as to bring up AND circuit 114. This occurs because line 82 is up since the tens position is off. Line 81 is up because the unit position has gone to zero, and inverter 115 is up because its input comes from the space test trigger 117 which is now off. This means that the pulse will be received on line 118 through AND circuit 114 which will then reset the carriage control trigger 27 and the start trigger 24 is turned off. This causes the carriage to stop.

While there have been shown and described and pointed out the fundamental novel features of the invention as applied to the preferred embodiment, it will be understood that various omisions and substitutions and changes in the form and details of the device illustrated and in its operation may be made by those skilled in the art, without departing from the spirit of the invention.

What is claimed is:

1. In combination, a carriage for use in a business machine for moving continuous forms and an electronic counter control for controlling movement of the carriage, machine program step means to initiate carriage movement and to activate the electronic counter control, the electronic counter control including carriage program means responsive to the machine program step means to direct the carriage to its next stop position, test means connected to the carriage program means to determine whether the carriage should skip or space when moving to its next stop position, a pulse generator gatable by the test means, electronic counters responsive to the pulse generator, one of the counters counting up to the next stop position for the carriage, the other counter counting up to the number of line spaces on the continuous form to be skipped over to arrive at the next stop position, the counters being connected to the test means to gate out the pulse generator when the counters arrive at the numbers indicated by the carriage program means, and pulse means on the carriage to act on one of the counters to count down from the number indicated so that when the counter reaches zero, the counter will supply a signal to stop the carriage.

2. In an accounting business machine comprising a carriage, and machine program step means connected to the carriage to start the carriage moving, an electronic counter control for controlling carriage movement including carriage program means indicating the next stop position of the carriage responsive to the machine program stop means, test means to determine whether to skip or space the carriage, a positions counter responsive to the carriage program means for indicating the present position and the next stop position of the carriage, a stop counter responsive to the carriage program means to indicate the difference of the two positions on the positions counter, the difference indicated by the stop counter being determined when the positions counter arrives at the next position indicated by the carriage program means, and pulse means on the carriage for reversing the count on the stop counter to stop the carriage when the stop counter reaches zero.

3. In a business machine comprising program means and a carriage, an electronic counter carriage control including counting means for determining the present line position on continuous forms and the next stop position, and the number of lines to be skipped or spaced, predetermined carriage program means for indicating the next desirable stop position for the continuous forms, test means to determine whether to skip or space, the program means connected to the carriage to start the carriage moving to its next stop line position, and counters responsive to the test means to determine where the carriage should move for its next stop position prior to the carriage moving, and to determine the speed at which the carriage is to move, the carriage being responsive to the output of the counters so as to skip or space to the next stop line position.

4. The combination with a carriage, of apparatus for controlling the movement of said carriage comprising an electronic reversible counter, means for advancing the counter step by step, program means to stop the counter when it has reached a predetermined programmed position, means to subtract from the counter as said carriage is moving, means for slowing down the speed of the carriage when the counter reaches a predetermined position other than zero and means for stopping the carriage when the counter advances to its zero position.

5. In a business machine comprising a carriage and machine instruction program means to supply a signal to start the carriage, an electronic counter carriage control for controlling movement of the carriage including carriage program means responsive to the machine instruction program step means for indicating whether the carriage should space or skip, and counter means responsive to the carriage program means for indicating the present position, the next stop position, the difference between the positions as well as the speed for skipping or spacing of the carriage, the counter means containing a reversible counter which is responsive to pulse means from the carriage to stop the carriage when it reaches a zero count.

6. In a machine, a carriage, driving means for driving the carriage at various speeds, and a speed control counter predeterminedly settable for controlling the speed of the driving means, the speed control counter comprising a skip control and a positions control counter, the skip control counter controlling the speed of the driving means and indicating the number of positions to skip over to arrive at the next stop position of the carriage, the positions counter indicating the present position of the carriage and the next stop position of the carriage.

7. Apparatus for controlling the movement of continuous forms in a business machine comprising a carriage for moving the continuous forms, drive means for driving the carriage at various speeds, a speed control counter predeterminedly settable for controlling the speed of the drive means, the speed control counter comprising a skip counter and a positions counter, the skip counter controlling the speed of the carriage and indicating the positions to be skipped over by the carriage, the positions counter indicating the present position of the carriage and the next stop position of the carriage, the skip counter being a reversible counter which is responsive to pulses received from the carriage to count down from the next stop position indicated on the counter, the skip counter including means for slowing down the carriage as it approaches zero, and stop means in the skip counter for stopping the carriage when the skip counter arrives at its zero position.

8. In combination, a carriage for use in a business machine for moving continuous forms, an electronic counter control for controlling movement of the carriage, the electronic counter control comprising a positain counter indicating the position at which the carriage is stopped, test means responsive to a machine program step to determine whether the carriage must perform a skipping or spacing operation, pulse means, the position counter being responsive to the pulse means so as to advance step by step to the next stop position for the carriage before the continuous forms have begun to move, a second counter normally at zero position responsive to the pulse means to advance synchronously with the positions counter to indicate the number of positions to be skipped over during movement of the carriage, reversible counting means in the second counter responsive to pulses receive from the carriage to count back at the rate of one step whenever the continuous forms have moved one line space, and means responsive to the zero position of the second counter to stop the movement of the carriage.

9. The combination as in claim 8 wherein speed control means are provided in the second counter to indicate the speed at which the carriage should move.

10. The combination as in claim 8 wherein the test means includes a space test means and a skip test means so that they can determine whether a skip or a space is to take place.

11. In a business machine comprising a carriage and machine program step means for providing a signal to initiate operation of the carriage, apparatus for controlling the operation of the carriage including test means responsive to said signal to determine if a skip or space operation is to be performed by the carriage; predetermined pluggable switching circuit means containing plugged hubs representing different skip conditions, said test means being connected to said pluggable switching circuit means to test for skip conditions, the pluggable switching circuit means being arranged to provide an output only if a skip is to be performed by the carriage; an electrical impulse generator for generating a series of electrical impulses; skip control means for gating the impulses from said generator, said skip control means being responsive to the output of said pluggable switching circuit means; a counting means, said counting means being connected to said generator, said counting means including a skip counter and a positions counter, each being responsive to the electrical impulses from said impulse generator, the positions counter being arranged to indicate carriage position and to provide a signal for the next stop position of the carriage as determined by the pluggable switching circuit means, the skip counter indicating the difference between the present carriage position and the next stop position of the carriage, the program step means also providing an output signal for line spacing; line spacing pluggable hub means for receiving the signal for line spacing from said program step means; line spacing selection logic circuit means connected to the line spacing pluggable hub means and to said skip and positions counters to provide an output signal for turning off said skip control means to prevent impulses generated by said generator from reaching said skip and positions counters without turning off the signal to initiate operation of said carriage; carriage impulse generator means for generating electrical impulses in response to movement of said carriage; reversible counting means in said skip counter to subtract from the value therein connected to said carriage impulse generator means; means for slowing the speed of the carriage upon said skip counter reaching a predetermined value other than zero; and means for stopping the movement of the carriage upon said skip counter reaching zero.

References Cited in the file of this patent

UNITED STATES PATENTS

| | | |
|---|---|---|
| 2,790,528 | Teitler | Apr. 20, 1957 |
| 2,831,561 | Speh | Apr. 22, 1958 |